US011638260B2

(12) United States Patent
Ryu et al.

(10) Patent No.: US 11,638,260 B2
(45) Date of Patent: Apr. 25, 2023

(54) UE CAPABILITY SIGNALING ABOUT TCI STATES OR SPATIAL RELATIONS FOR A GROUP OF BANDWIDTH PARTS OR COMPONENT CARRIERS

(71) Applicant: QUALCOMM Incorporated, San Diego, CA (US)

(72) Inventors: Jung Ho Ryu, Fort Lee, NJ (US); Yan Zhou, San Diego, CA (US); Tianyang Bai, Somerville, NJ (US); Tao Luo, San Diego, CA (US); Junyi Li, Chester, NJ (US); Kiran Venugopal, Raritan, NJ (US)

(73) Assignee: QUALCOMM INCORPORATED, San Diego, CA (US)

(*) Notice: Subject to any disclaimer, the term of this patent is extended or adjusted under 35 U.S.C. 154(b) by 97 days.

(21) Appl. No.: 17/026,079

(22) Filed: Sep. 18, 2020

(65) Prior Publication Data

US 2021/0092729 A1    Mar. 25, 2021

Related U.S. Application Data

(60) Provisional application No. 62/903,645, filed on Sep. 20, 2019.

(51) Int. Cl.
*H04W 72/04* (2009.01)
*H04W 72/08* (2009.01)
(Continued)

(52) U.S. Cl.
CPC ....... *H04W 72/048* (2013.01); *H04W 72/042* (2013.01); *H04W 72/085* (2013.01); *H04W 72/0453* (2013.01); *H04W 88/02* (2013.01)

(58) Field of Classification Search
CPC ............ H04W 72/048; H04W 72/042; H04W 72/085; H04W 72/0453; H04W 88/02
(Continued)

(56) References Cited

U.S. PATENT DOCUMENTS

2019/0296805 A1* 9/2019 Son ........................ H04W 76/27

FOREIGN PATENT DOCUMENTS

CN    110831142 A  *  2/2020  ............ H04W 52/42
EP    3979696 A1  *  4/2022
(Continued)

OTHER PUBLICATIONS

LG Electronics et al, "Feature lead summary of Enhancements on Multi-beam Operations", 3GPP TSG RAN WG1 Meeting #98, R1-1909695, Priority Date: Aug. 26-30, 2019) (Year: 2019).*
CATT: "Further Discussion on TCI State Switching Requirements", 3GPP Draft, 3GPP TSG-RAN4#90bis Meeting, R4-1903226, TCI State Switching Delay, 3RD Generation Partnership Project (3GPP), Mobile Competence Centre, 650, Route Des Lucioles, F-06921, Sophia-Antipolis Cedex, France, vol. RAN WG4, No. Xi'an China, Apr. 8, 2019-Apr. 12, 2019, Apr. 1, 2019 (Apr. 1, 2019), XP051713658, 3 pages.
(Continued)

*Primary Examiner* — Kwang B Yao
*Assistant Examiner* — Xuan Lu
(74) *Attorney, Agent, or Firm* — Arent Fox, LLP

(57) ABSTRACT

A user equipment (UE) transmits capability information to a base station indicating a first number of active transmission configuration indication (TCI) states or active spatial relations supported by the UE per group of bandwidth parts (BWPs) or per group of component carriers (CCs) for use in receiving control information or data. The UE receives, from the base station, a configuration of a second number of active TCI states or active spatial relations for the group of BWPs or the group of CCs that is limited to be less than or equal to the first number of active TCI states or active spatial relations supported by the UE. The UE monitors for downlink communication based on the second number of active TCI states. The UE uses the active spatial relations for uplink transmissions.

18 Claims, 12 Drawing Sheets

(51) Int. Cl.
  *H04W 88/02* (2009.01)
  *H04L 5/00* (2006.01)
  *H04W 48/12* (2009.01)
  *H04W 8/22* (2009.01)
  *H04W 16/28* (2009.01)
  *H04W 72/0453* (2023.01)

(58) Field of Classification Search
  USPC .......................................................... 370/329
  See application file for complete search history.

(56) References Cited

FOREIGN PATENT DOCUMENTS

WO      2019143900 A1    7/2019
WO    WO-2020240633 A1 * 12/2020

OTHER PUBLICATIONS

Huawei, et al., "Correction on UE Capability Related to Beam Management", 3GPP TSG-RAN2 Meeting #107, 3GPP Draft; R2-1911028 Correction On UE Capability Related to Beam Management, 3rd Generation Partnership Project (3GPP), Mobile Competence Centre; 650, Route Des Lucioles; F-06921 Sophia-Antipolis, vol. RAN WG2, No. Prague, Czech Republic; Aug. 26, 2019-Aug. 30, 2019, Aug. 16, 2019 (Aug. 16, 2019), 11 Pages, XP051768790.
International Search Report and Written Opinion—PCT/US2020/051685—ISA/EPO—dated Mar. 4, 2021.

* cited by examiner

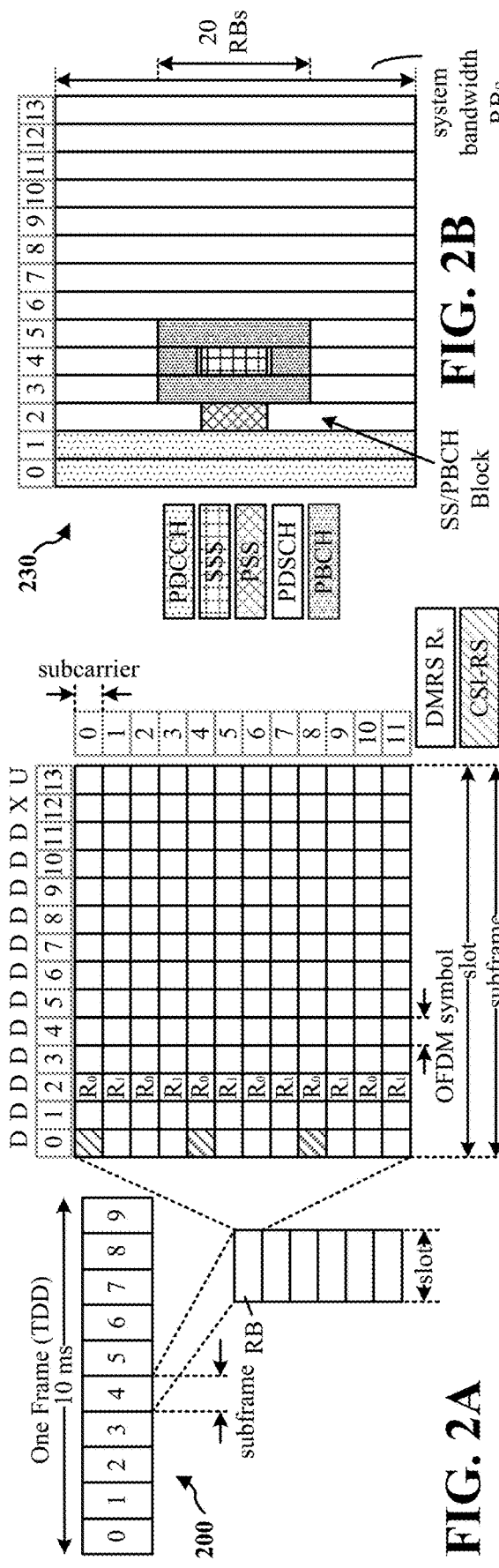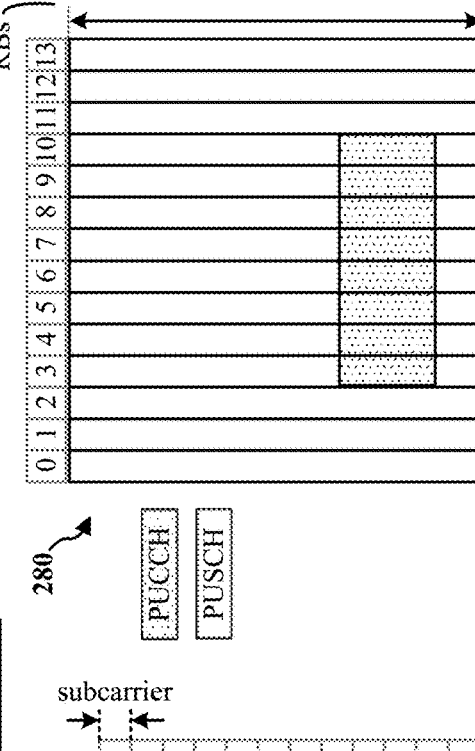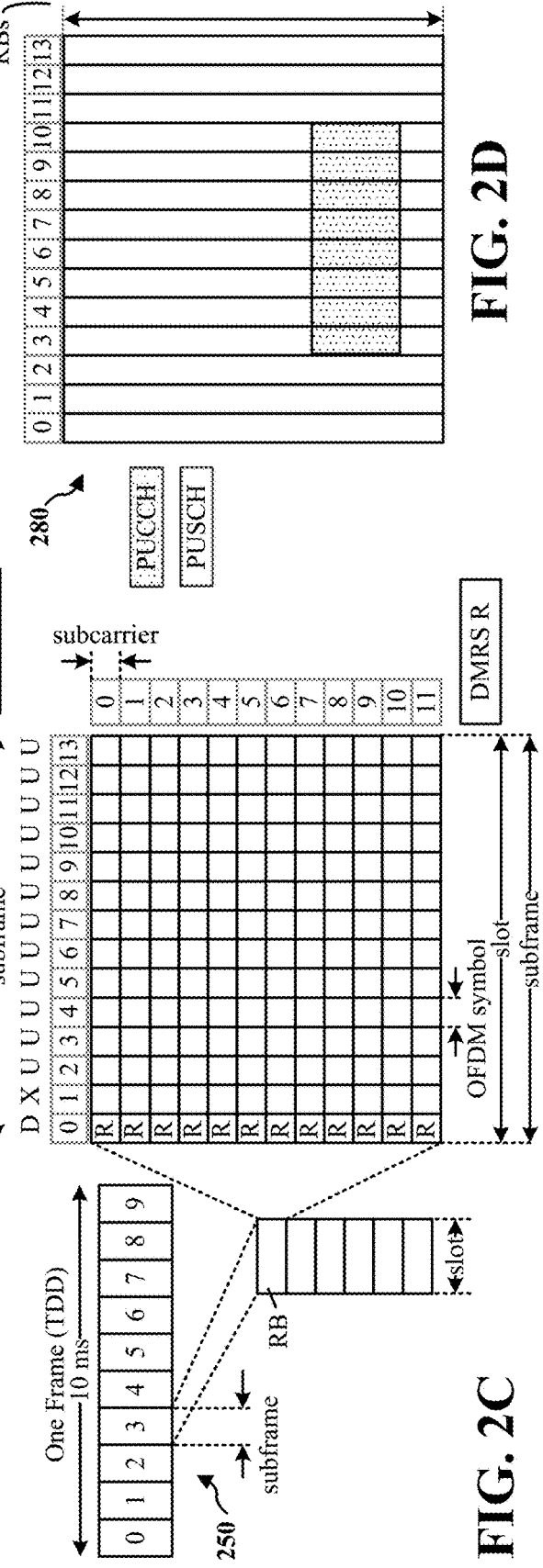
FIG. 2A  FIG. 2B  FIG. 2C  FIG. 2D

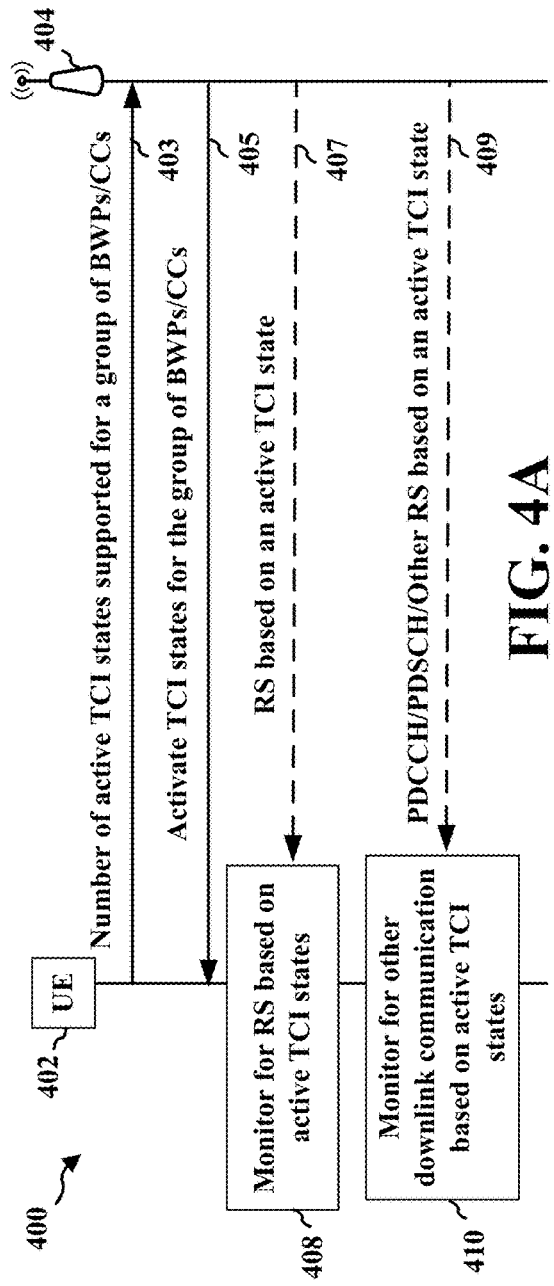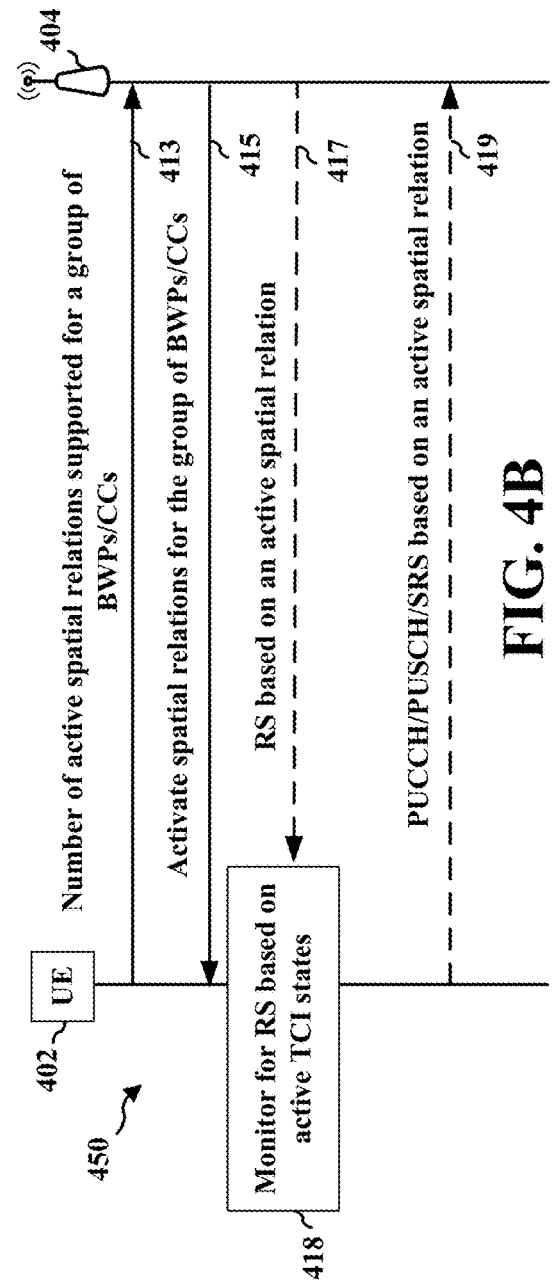

UE CAPABILITY SIGNALING ABOUT TCI STATES OR SPATIAL RELATIONS FOR A GROUP OF BANDWIDTH PARTS OR COMPONENT CARRIERS

CROSS-REFERENCE TO RELATED APPLICATION(S)

This application claims the benefit of U.S. Provisional Application Ser. No. 62/903,645, entitled "UE CAPABILITY SIGNALING ABOUT TCI STATES OR SPATIAL RELATIONS FOR A GROUP OF BANDWIDTH PARTS OR A GROUP OF COMPONENT CARRIERS" and filed on Sep. 20, 2019, the contents of which are expressly incorporated by reference herein in their entirety.

BACKGROUND

Technical Field

The present disclosure relates generally to wireless communication, and more particularly, to user equipment (UE) capability signaling regarding transmission configuration indication (TCI) states and spatial relations.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC).

Wireless communication between a base station and a UE may include the use of transmission configuration indication (TCI) states or spatial relations. TCI states are associated with reference signals that can be provided to a UE in downlink control information (DCI) and used by the UE to identify and decode downlink data. Improvements are presented herein for signaling about TCI states or spatial relations. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method and an apparatus are provided for wireless communication at a UE. The method transmits capability information to a base station indicating a first number of active TCI states supported by the UE per group of BWPs or per group of CCs including control and data. The apparatus receives, from the base station, a configuration of a second number of active TCI states for the group of BWPs or CCs that is limited to be less than or equal to the first number of active TCI states supported by the UE. The apparatus monitors for downlink communication based on the second number of active TCI states.

In an aspect of the disclosure, a method and an apparatus are provided for wireless communication at a UE. The method transmits capability information to a base station indicating a first number of active spatial relations supported by the UE per group of BWPs or per group of CCs. The apparatus receives, from the base station, a configuration of a second number of active spatial relations for the group of BWPs or CCs that is limited to be less than or equal to the first number of active spatial relations supported by the UE.

In an aspect of the disclosure, a method and an apparatus are provided for wireless communication at a UE. The apparatus transmits capability information to a base station indicating a first number of active TCI states supported by the UE per group of BWPs or per group of CCs including control and data. The apparatus receives, from the base station, a configuration of a second number of active TCI states for the group of BWPs or CCs that is limited to be less than or equal to the first number of active TCI states supported by the UE. The apparatus monitors for downlink communication based on the second number of active TCI states.

In an aspect of the disclosure, a method and an apparatus are provided for wireless communication at a UE. The apparatus transmits capability information to a base station indicating a first number of active spatial relations supported by the UE per group of BWPs or per group of CCs. The apparatus receives, from the base station, a configuration of a second number of active spatial relations for the group of BWPs or CCs that is limited to be less than or equal to the first number of active spatial relations supported by the UE.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 4A illustrates an example communication flow between a base station and a UE including signaling of UE capability information about a number of active transmission configuration indication (TCI) states supported by the UE in accordance with some aspects of the present disclosure.

FIG. 4B illustrates an example communication flow between a base station and a UE including signaling of UE capability information about a number of active spatial relations supported by the UE in accordance with some aspects of the present disclosure.

DETAILED DESCRIPTION

Figure 1:
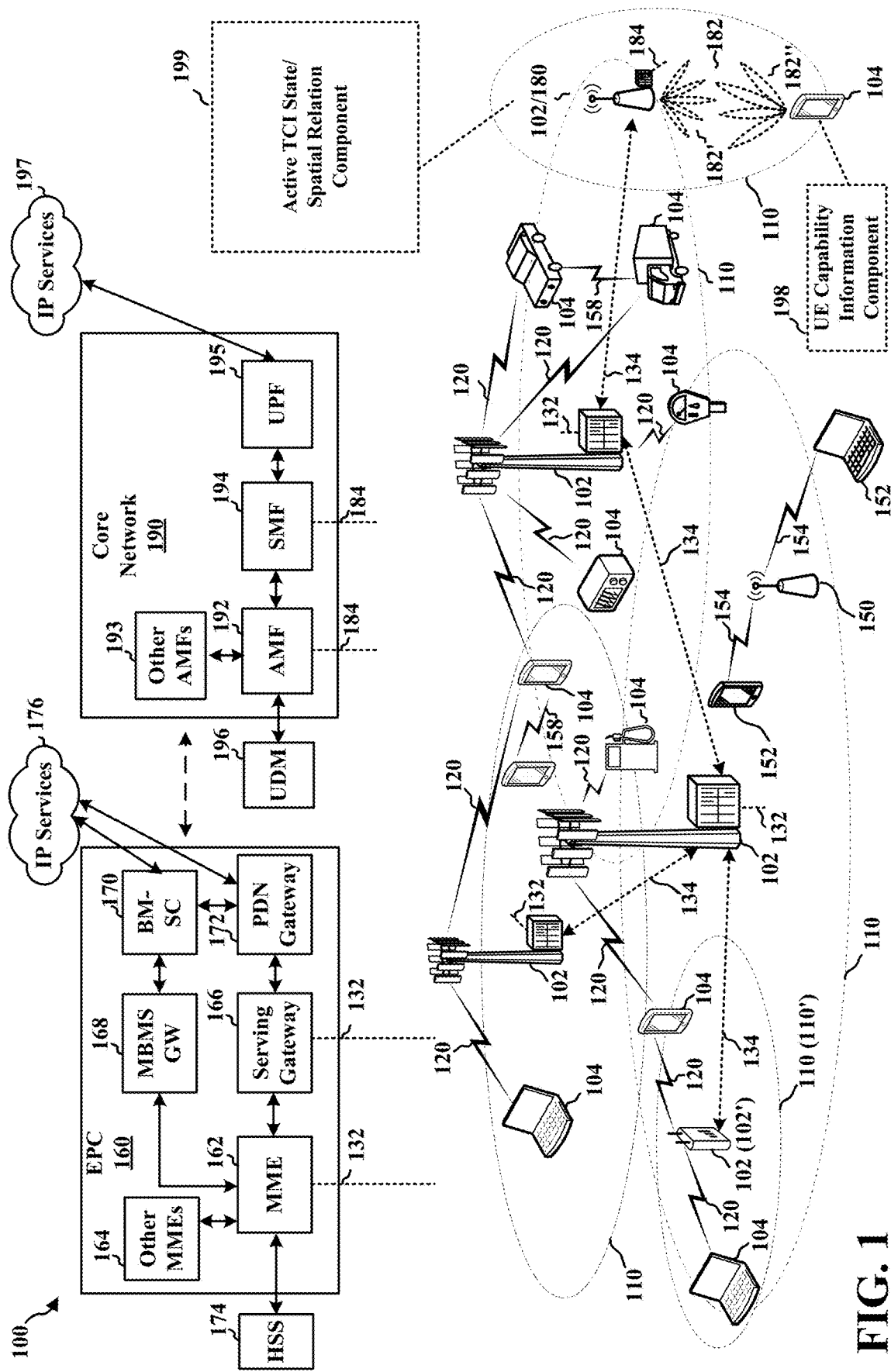
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those having ordinary skill in the art that these concepts may be practiced without these specific details. In some instances, structures and components are shown in block diagram form in order to avoid obscuring such concepts.

A user equipment (UE) may provide information to a base station about the number of active transmission configuration indication (TCI) states that the UE supports (such as how many active TCI states the UE can monitor, for example). TCI states provide reference signals to enable the UE to properly decode spatially-multiplexed signals, for example. More specifically, TCI states can be monitored for Quasi-Co-Location (QCL) information (spatial indicators from which a UE can infer spatial information such as co-located antenna ports, Doppler shift information between antennas, and other spatial parameters). The QCL information in these TCI states may enable UEs to identify downlink data or control information intended for it.

In general, if a TCI state is activated, the reference signals included in the TCI state are monitored for the QCL information necessary to enable the UE to access other reference signals (RSs) as well as downlink data and control information. As the number of component carriers (CCs) increases, so too do the number of TCI states that need to be monitored.

The number of TCI states can be provided to the network in different ways. However, the UE may inadvertently be allotted too many component carriers (CCs) and the number of active TCI states that the UE needs to monitor may be too much for the UE's limited hardware to handle. Exceeding the maximum allowable TCI states may result in data errors or lost connections on the UE side.

Recent proposals to the standard have included that the maximum number of available TCI states for UEs be communicated per BWP (bandwidth part) per CC. If the UE indicates a number of active TCI states per bandwidth part (BWP) per component carrier (CC) as proposed, a UE may be more likely to overstate the true maximum number of TCI states it can manage. As a result, the base station may assume that the UE is capable of tracking more TCI states than the true capability of the UE. The UE may therefore miss key spatial reference signals and along with it, opportunities to decode meaningful data.

The problem can be exacerbated with UEs that have more limited functionality. Even though the maximums may again be based on ostensibly objective criteria, the UE may have a limited number of hardware components, such as radio frequency (RF) receive (RX) chains, that it is able to effectively monitor for reference signals having different TCI states. Additionally, monitoring for multiple TCI states may drain a battery more quickly.

The present disclosure addresses these and other shortcomings in the art. In one aspect of the disclosure, the UE can be configured to express as capability information a maximum number of TCI states available per group of BWPs/CCs, where a group can be a band, a cell group, or as otherwise indicated by a UE. The UE can further be configured to transmit this capability information to a base station. The UE may then receive, in response to transmitting the initial capability information, another number of active TCI states that is less than the maximum number. The UE may proceed to actively monitor for a downlink communication based on this other number of TCI states provided by the base station.

In transmitting the capability information above, the UE can provide its own definition of a maximum number of TCI states based on, for example, objective factors that maintain the number to a more acceptable margin of error that is less likely to place the UE in jeopardy of losing downlink information due to inadequate spatial resources. In other configurations, the base station may include an active TCI state component for receiving the capability information from the UE and for restricting the number of TCI states activated for the corresponding group of BWPs or group of CCs to avoid exceeding the number of TCI states that are supported by the UE.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102*a* may operate in a licensed or an unlicensed frequency spectrum. When operating in an unlicensed frequency spectrum, the small cell 102*a* may employ NR and use the same 5 GHz unlicensed frequency spectrum as used by the Wi-Fi AP 150. The small cell 102*a*, employing NR in an unlicensed frequency spectrum, may boost coverage to or increase capacity of the access network.

A base station 102, whether a small cell 102*a* or a large cell (for example, macro base station), may include or be referred to as an eNB, gNodeB (gNB), or another type of base station. Some base stations 180, such as a gNB, may operate in a traditional sub 6 GHz spectrum, in millimeter wave (mmW) frequencies, or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station, such as base station 180, may utilize beamforming 182 with the UE 104 to compensate for the extremely high path loss and short range. The base station 180 and the UE 104 may each include multiple antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a UE capability information component 198 configured to provide capability information to the base station 180 indicating a number of active TCI states or active spatial relations that are supported by the UE 104 for a group of BWPs or a group of CC. The base station 180 may include an active TCI state/spatial relation component 199 configured to receive the capability information from the UE 104 and to restrict the number of TCI states or spatial relations that are activated by the base station 180 for the corresponding group of BWPs or group of CCs to avoid exceeding the number of TCI states that are supported by the UE 104 for the corresponding group of BWPs or the group of CCs. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
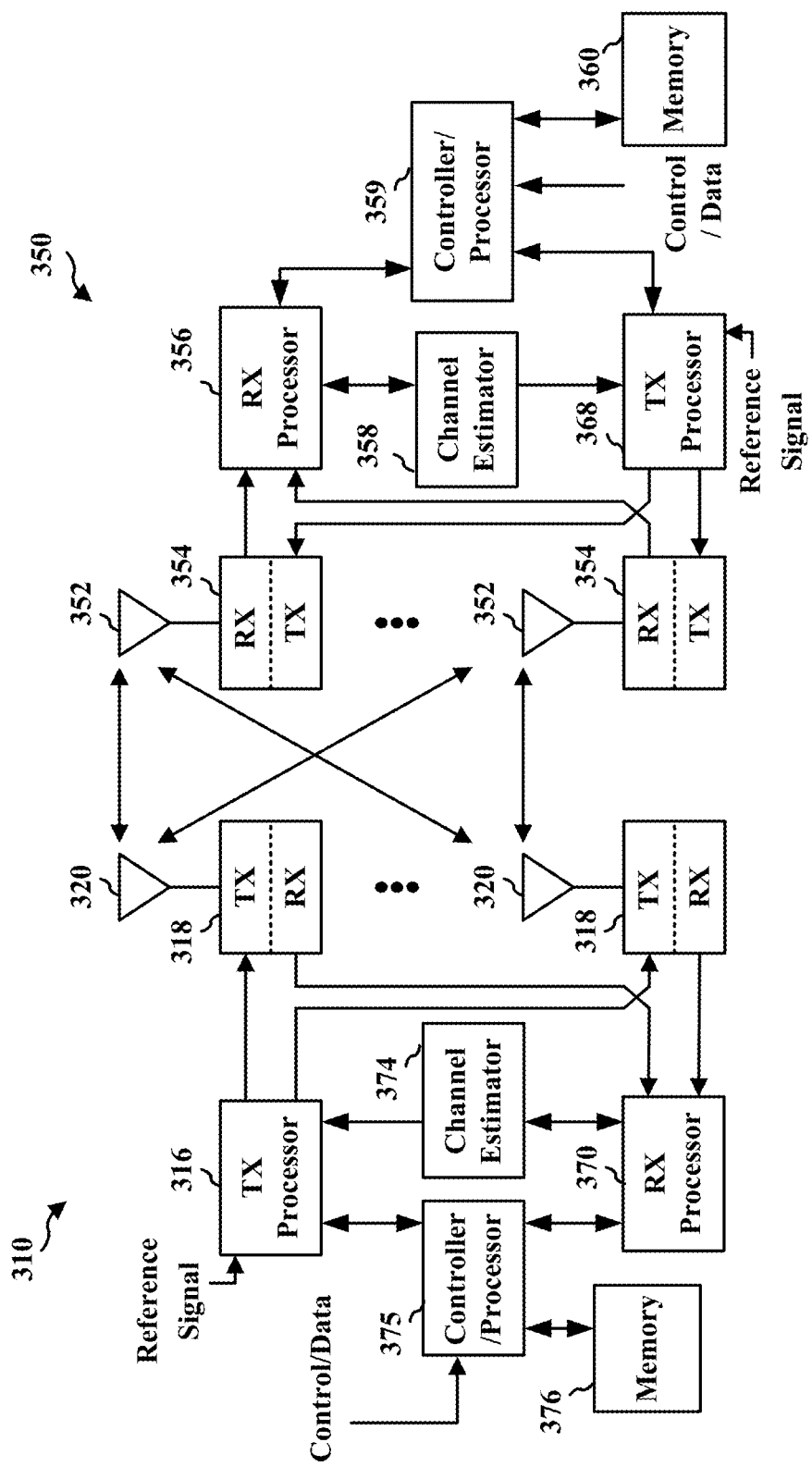
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A base station may provide TCI states to a UE in information elements that indicate to the UE parameters to use in receiving particular reference signals. The TCI state may help the UE to determine a beam to use to monitor for a reference signal. Each TCI state may have a TCI state index. A reference signal may have an associated quasi co-location (QCL) type. Two antenna ports may be quasi co-located, for example, if properties of a channel over which a symbol on one antenna port is conveyed can be inferred from the channel over which a symbol on the other antenna port is conveyed. QCL Type D relates to a spatial parameter and may be used by a UE, for example, for communication with a mmW base station. Two channels that are QCL may experience similar channel conditions so that receiver able to receive one channel is likely to be able to receive the other channel.

When a base station has data to transmit to the UE, the base station may indicate to the UE which beam to use to receive the data. The base station may indicate to the UE a TCI state associated with a reference signal by sending the corresponding TCI index in control signaling to the UE. The UE may use the same beam that is used to monitor for the reference signal, based on the indicated TCI state, to receive the data. The TCI state index enables the base station to convey to the UE information about which beam to use to receive the data without explicitly providing a beam index.

A base station may configure a UE with a list of multiple candidate TCI states. The base station may send the candidate TCI states to the UE in RRC communication, for example. The base station may use the candidate TCI states for sending QCL indications to the UE. Each candidate TCI state on the list may include an index. The base station may activate a subset of the candidate TCI states on the list. The subset may include one or more TCI states. The base station may activate and deactivate TCI states for the UE.

The base station may configure the UE with a list of many candidate TCI states. However, not all of the candidate TCI states may be active for a UE. If a TCI state is active, the UE may monitor for the reference signal defined for that TCI state. Such monitoring helps to ensure that the UE can receive the reference signal and, therefore, can also receive data using the same beam. The monitoring of the reference signal by the UE helps to track the beams that the UE can receive.

When the UE initially makes a connection with a base station, the UE may provide information to the base station about the number of active TCI states that the UE supports (such as how many active TCI states the UE can monitor). If the UE indicates the number of active TCI states supported per BWP per CC, the base station may assume that the UE is capable of tracking more TCI states than the true capability of the UE. As a didactic example, if a UE is configured with four BWPs and four CCs (resulting in sixteen unique combinations of BWP and CC), and if the UE indicates that it is capable of activating two TCI states per BWP per CC, then the base station may assume that the UE can monitor reference signals associated with thirty-two TCI states. However, a UE has a limited number of hardware components, such as reception chains, that are able to monitor for reference signals having different TCI states. Additionally, monitoring for multiple TCI states may drain a battery of the UE more quickly due to the amount of processing. As presented herein, a UE may instead provide capability information to a base station that indicates a number of TCI states that are supported by the UE for a group of BWPs or for a group of CCs.

FIG. 4A illustrates an example communication flow 400 between a base station 404 and a UE 402 including signaling of UE capability information about a number of active TCI states supported by the UE for a group of BWPs or a group of CCs in accordance with some aspects of the present disclosure. The UE 402 may send information about the number of active TCI states supported for the group of BWPs or the group of CCs 403 in an information element of UE assistance information that the UE 402 provides to the base station 404. The information element may be included in a MIMO parameters per band information element. In some implementations, the UE may signal such capability information for receiving data via a PDSCH. Additionally or alternatively, the UE may signal such capability information for receiving control information via a PDCCH.

The group of BWPs may correspond to a frequency band. Therefore, the UE 402 may indicate a number of active TCI states that the UE 402 supports for the frequency band. In some examples, the number may correspond to a maximum number of active TCI states supported by the UE for the group of BWPs or the group of CCs. The group of CCs may correspond to a cell group. Therefore, the UE 402 may indicate a number of active TCI states that are supported by the UE 402 for the cell group. For example, the UE 402 may indicate a number of active TCI states that the UE supports for a master cell group. Additionally or alternatively, the UE 402 may indicate a number of active TCI states that the UE 402 supports for a secondary cell group. The UE 402 may indicate the particular group of BWPs or the particular group of CCs corresponding to the number of active TCI states supported by the UE 402.

In addition to the number, the UE 402 may further indicate whether the support is being indicated for a group of BWPs or for a group of CCs (such as for a cell group). The UE 402 may provide the number in a UE capability field and may provide an additional indication in an additional UE capability field that enables the base station 404 to interpret the UE capability field that includes the number provided by the UE 402.

As illustrated, the base station 404 may activate TCI states, at 405, for the UE 402 from previously configured candidate TCI states. The base station 404 may use the UE capability information to limit activation of candidate TCI states for a particular group of BWPs or a particular group of CCs to not exceed the corresponding number indicated by the UE 402. The base station 404 may activate and deactivate TCI states for the UE 402.

As illustrated at 408, the UE 402 may use the active TCI states to monitor for corresponding reference signals 407. As shown, the base station 404 at 407 may send a reference signal based on an active TCI state. The UE 402 may also use the active TCI states to monitor for other downlink communication from the base station, at 410. For example, the base station 404 may transmit PDCCH, PDSCH, or other reference signals 409 having a QCL relationship to the active TCI state for a particular reference signal.

The base station 404 may use a TCI state to indicate to the UE 402 beams for receiving downlink communication from a base station 404. For uplink communication, the base station 404 may configure the UE 402 for a spatial relation. A spatial relation may indicate to the UE 402 a beam to use for transmitting PUSCH, PUCCH, or SRS. Similar to the indication of the number of active TCI states, the UE 402 may indicate to the base station 404 a number of active spatial relations that are supported by the UE 402 for a group of BWPs or a group of CCs. In some examples, the number may correspond to a maximum number of active spatial relations that are supported by the UE 402 for the group of BWPs or the group of CCs. FIG. 4B illustrates an example communication flow 450 between a base station 404 and a UE 402 including signaling of UE capability information about a number of active spatial relations supported by the UE 402 in accordance with some aspects of the present disclosure.

The UE 402 may send information 413 about the number of active spatial relations supported for the group of BWPs or the group of CCs in an information element of UE assistance information that the UE 402 provides to the base station 404. The information element may be included in a MIMO parameters per band information element.

The group of BWPs may correspond to a frequency band. Therefore, the UE 402 may indicate a number of active spatial relations that the UE 402 supports for the frequency band. The group of CCs may correspond to a cell group. Therefore, the UE 402 may indicate a number of active spatial relations that are supported by the UE 402 for the cell group. For example, the UE 402 may indicate a number of active spatial relations that the UE supports for a master cell group. Additionally or alternatively, the UE 402 may indicate a number of active spatial relations that the UE 402 supports for a secondary cell group. The UE 402 may indicate the particular group of BWPs or the particular group of CCs corresponding to the number of active spatial relations supported by the UE 402.

In addition to the number, the UE 402 may further indicate whether the support is indicated for a group of BWPs or for a group of CCs (such as for a cell group). The UE 402 may provide the number in a UE capability field and may provide an additional indication in an additional UE capability field that enables the base station 404 to interpret the UE capability field that includes the number provided by the UE 402.

As illustrated, the base station 404 may activate spatial relations, at 415, for the UE 402 from previously configured candidate TCI states. The base station 404 may use the UE capability information to limit activation of candidate spatial relations for a particular group of BWPs or a particular group of CCs to not exceed the corresponding number indicated by the UE 402. The base station 404 may activate and deactivate spatial relations for the UE 402.

As illustrated at 418, the UE 402 may use the active spatial relations to monitor for corresponding reference signals 417. The UE 402 may also use the active spatial relations to transmit uplink communication 419 from the base station. For example, the base station 404 may transmit PUCCH, PDSCH, or SRS having a QCL relationship based on the active spatial relation for a particular reference signal.

If two different BWPs are within the same frequency band, the UE 402 may use the same beam to receive a signal in one of the BWPs and also to receive a signal in the other BWP. Although the BWPs may be different, propagation characteristics for the two BWPs may be similar. For example, a BWP at 28 GHz and 29 GHz, may have similar propagation characteristics between the same transmitter and receiver. Therefore, information that is learned for an active TCI state for the BWP at 28 GHz may be useful for communication using the 29 GHz BWP when the two BWPs are within the same frequency band.

Figure 5:
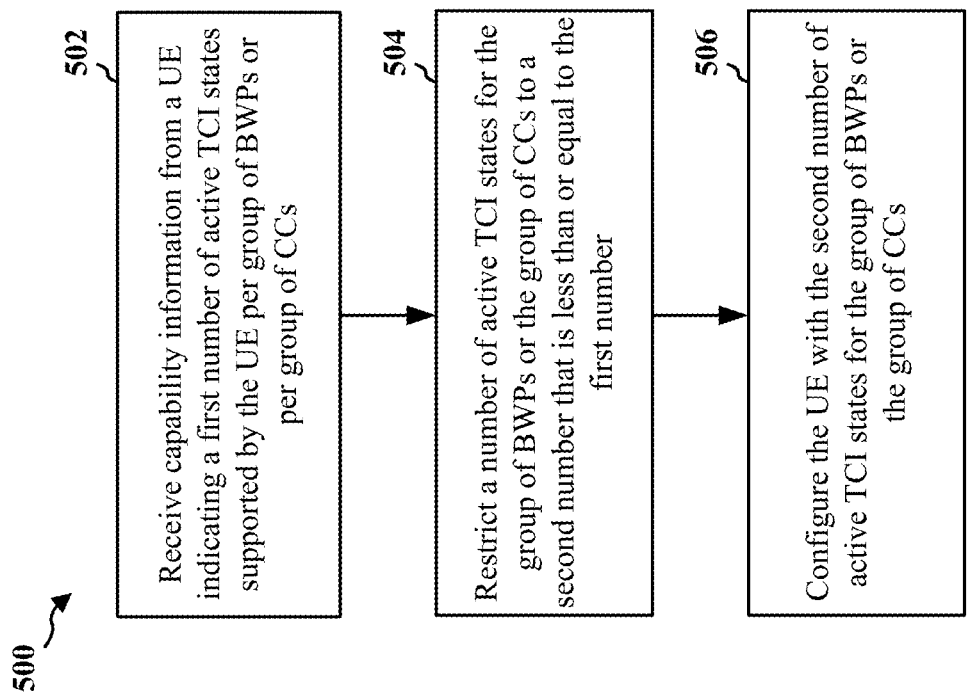
FIG. 5 is a flowchart illustrating a method of wireless communication that supports the use of UE capability information about a number of active TCI states supported by a UE for a group of bandwidth parts (BWPs) or a group of component carriers (CC) in accordance with some aspects of the present disclosure.

FIG. 5 is a flowchart 500 of a method of wireless communication. The method may be performed by a base station or a component of a base station (such as the base station 180, 310, 404; the apparatus 702; the processing system 814, which may include the memory 376 and which may be the entire base station or a component of the base station, such as the TX processor 316, the RX processor 370, or the controller/processor 375 of base station 310).

At 502, the base station receives capability information from a UE indicating a first number of active TCI states supported by the UE per group of BWPs or per group of CCs, for example, for use in receiving control information (for example, via a PDCCH) or data (for example, via a PDSCH). The reception of the capability information may be performed, for example, by the reception component 704 or the UE capability component 708 of the apparatus 702 in FIG. 7. The base station may further receive an indication from the UE that indicates whether the group for which the first number of active TCI states is supported is the group of BWPs or the group of CCs. In some aspects, the capability information may indicate the first number of active TCI states supported by the UE for a frequency band. In some aspects, the capability information may indicate the first number of active TCI states supported by the UE for a cell group. The cell group may include a master cell group or a secondary cell group. For example, the base station may receive UE capability information indicating a number of active TCI states that the UE supports for a master cell group. Alternatively or additionally, the base station may receive UE capability information indicating a number of active TCI states that the UE supports for a secondary cell group.

At 504, the base station restricts a number of active TCI states for the group of BWPs or the group of CCs to a second number that is less than or equal to the first number. The restriction may be performed, for example, by the restriction component 710 of the apparatus 702 in FIG. 7.

At 506, the base station configures the UE with the second number of active TCI states for the group of BWPs or the group of CCs. For example, the base station may activate TCI states for the group of BWPs or the group of CCs and may limit the number of activated TCI states for the UE to avoid exceeding the first number of TCI states for the group of BWPs or the group of CCs. The configuration may be performed, for example, by the active TCI state component 712 of the apparatus 702 in FIG. 7.

Figure 6:
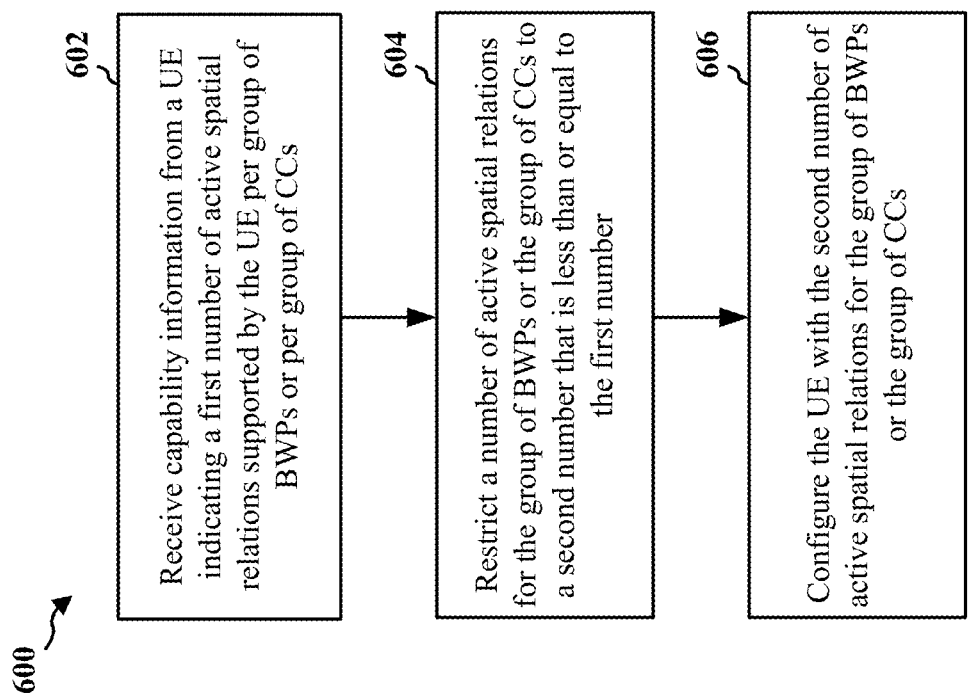
FIG. 6 is a flowchart illustrating a method of wireless communication that supports the use of UE capability information about a number of active spatial relations supported by a UE for a group of BWPs or a group of CC in accordance with some aspects of the present disclosure.

FIG. 6 is a flowchart 600 of a method of wireless communication. The method may be performed by a base station or a component of a base station (such as the base station 180, 310, 404; the apparatus 702; the processing system 814, which may include the memory 376 and which may be the entire base station or a component of the base station, such as the TX processor 316, the RX processor 370, or the controller/processor 375 of base station 310).

At 602, the base station receives capability information from a UE indicating a first number of active spatial relations supported by the UE per group of BWPs or per group of CC. The reception of the capability information may be performed, for example, by the reception component 704 or the UE capability component 708 of the apparatus 702 in FIG. 7. The base station may further receive an indication from the UE that indicates whether the group for which the first number of active spatial relations is supported is the group of BWPs or the group of CCs. In some aspects, the capability information may indicate the first number of active spatial relations supported by the UE for a frequency band. In some aspects, the capability information may indicate the first number of active spatial relations supported by the UE for a cell group. The cell group may include a master cell group or a secondary cell group. For example, the base station may receive UE capability information indicating a number of active spatial relations that the UE supports for a master cell group. Alternatively or additionally, the base station may receive UE capability information indicating a number of active spatial relations that the UE supports for a secondary cell group.

At 604, the base station restricts a number of active spatial relations for the group of BWPs or the group of CCs to a second number that is less than or equal to the first number. The restriction may be performed, for example, by the restriction component 710 of the apparatus 702 in FIG. 7.

At 606, the base station configures the UE with the second number of active spatial relations for the group of BWPs or the group of CCs. For example, the base station may activate spatial relations for the group of BWPs or the group of CCs and may limit the number of active spatial relations to avoid exceeding the first number of spatial relations for the group of BWPs or the group of CCs. The configuration may be performed, for example, by the active spatial relation component 714 of the apparatus 702 in FIG. 7.

Figure 7:
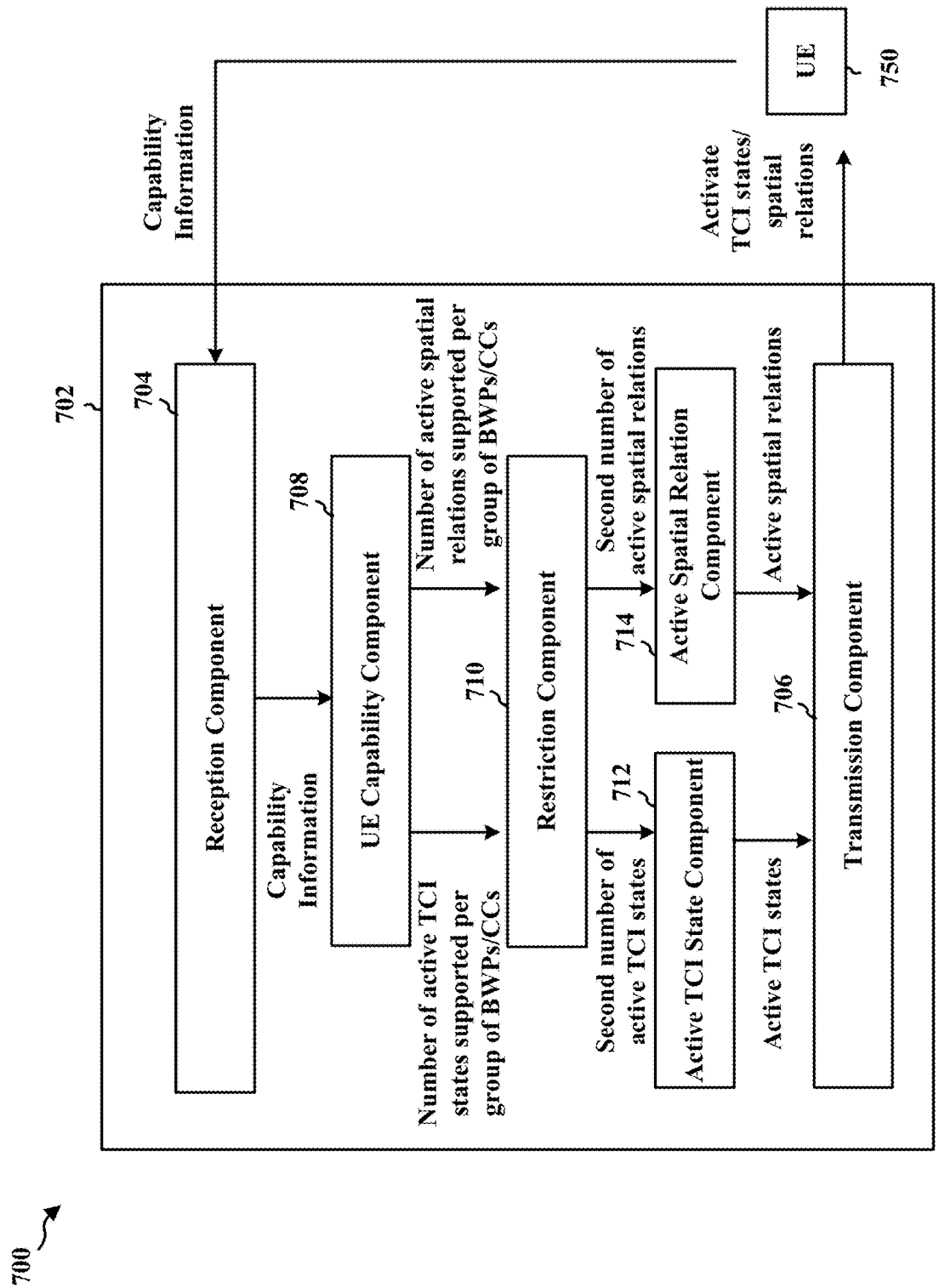
FIG. 7 is a conceptual data flow diagram illustrating the data flow between different components in an example apparatus in accordance with some aspects of the present disclosure.

FIG. 7 is a conceptual data flow diagram 700 illustrating the data flow between different means/components in an example apparatus 702. The apparatus may be a base station. The apparatus 702 includes a reception component 704 configured to receive uplink communication from the UE 750 and a transmission component 706 configured to transmit downlink communication to the UE 750. Apparatus 702 may include a UE capability component 708 that is configured to receive capability information from the UE 750 indicating a first number of active TCI states supported by the UE per group of BWPs or per group of CCs for use in receiving control information or data, such as described in connection with the block 502 in FIG. 5. The apparatus 702 may include a restriction component 710 that is configured to restrict a number of active TCI states for the group of BWPs or the group of CCs to a second number that is less than or equal to the first number, such as described in connection with the block 504 in FIG. 5. The apparatus 702 may include an active TCI state component 712 that may configure the UE 750 with the second number of active TCI states for the group of BWPs or the group of CCs, such as described in connection with the block 506 in FIG. 5.

In some examples, the UE capability component 708 may be configured to receive capability information from the UE 750 indicating a first number of active spatial relations supported by the UE per group of BWPs or per group of CCs, such as described in connection with the block 602 in FIG. 6. In some examples, the restriction component 710 may be configured to restrict a number of active spatial relations for the group of BWPs or the group of CCs to a second number that is less than or equal to the first number, such as described in connection with the block 604 in FIG. 6. The apparatus 702 may include an active spatial relation component 714 that may configure the UE 750 with the second number of active spatial relations for the group of BWPs or the group of CCs, such as described in connection with the block 606 in FIG. 6. The UE capability component 708 may be further configured to receive an indication that indicates whether the group for which the first number of active TCI states is supported is the group of BWPs or the group of CCs. The UE capability component 708 may be further configured to receive an indication that indicates whether the group for which the first number of active spatial relations is supported is the group of BWPs or the group of CCs.

The apparatus 702 may include additional components that perform each of the blocks of the algorithm in the aforementioned flowcharts of FIGS. 5 and 6, as well as aspects of FIG. 4. As such, each block in the aforementioned flowcharts of FIGS. 5 and 6, as well as aspects of FIG. 4, may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
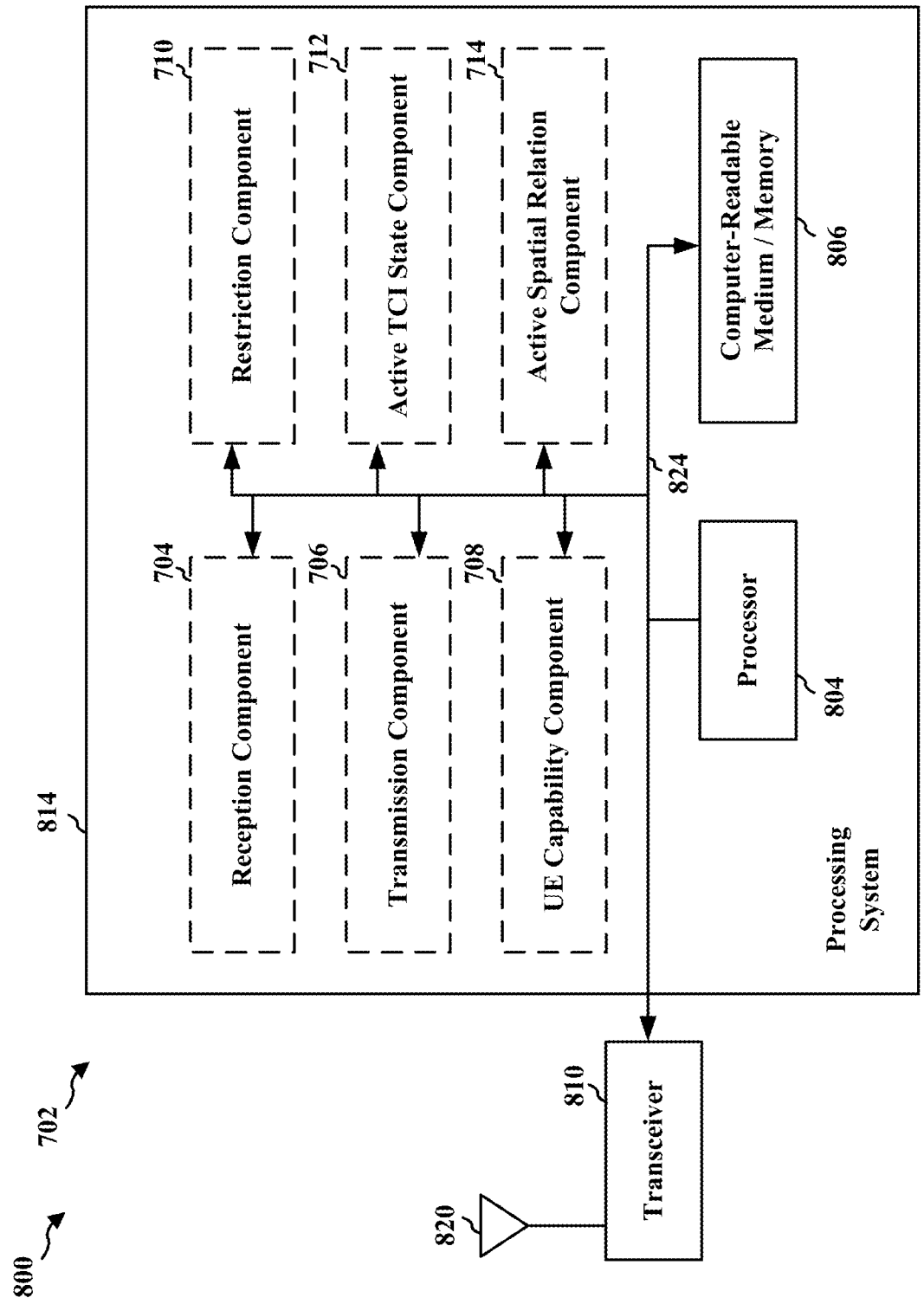
FIG. 8 is a diagram illustrating an example of a hardware implementation for an apparatus employing a processing system in accordance with some aspects of the present disclosure.

FIG. 8 is a diagram 800 illustrating an example of a hardware implementation for an apparatus 702 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors or hardware components, represented by the processor 804, the components 704, 706, 708, 710, 712, 714, and the computer-readable medium/memory 806. The bus 824 may also link various other circuits such as timing sources, peripherals, voltage regulators, and power management circuits.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described herein for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the base station 310 and may include the memory 376 or at least one of the TX processor 316, the RX processor 370, and the controller/processor 375. Alternatively, the processing system 814 may be the entire base station (such as see 310 of FIG. 3).

In one configuration, the apparatus 702 for wireless communication includes means for receiving capability information from a UE indicating a first number of active TCI states supported by the UE per group of BWPs or per group of CCs for use in receiving control information or data. The apparatus 702 may include means for restricting a number of active TCI states for the group of BWPs or the group of CCs to a second number that is less than or equal to the first number and means for configuring the UE with the second number of active TCI states for the group of BWPs or the group of CCs. The apparatus 702 may include means for receiving an indication that indicates whether the group for which the first number of active TCI states is supported is the group of BWPs or the group of CCs. The apparatus may include receiving capability information from a UE indicating a first number of active spatial relations supported by the UE per group of BWPs or per group of CCs. The apparatus 702 may include means for restricting a number of active spatial relations for the group of BWPs or the group of CCs to a second number that is less than or equal to the first number and means for configuring the UE with the second number of active spatial relations for the group of BWPs or the group of CCs. The apparatus 702 may include means for receiving an indication that indicates whether the group for which the first number of active spatial relations is supported is the group of BWPs or the group of CCs. The aforementioned means may be one or more of the aforementioned components of the apparatus 702 or the processing system 814 of the apparatus 702 configured to perform the functions recited by the aforementioned means. As described herein, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
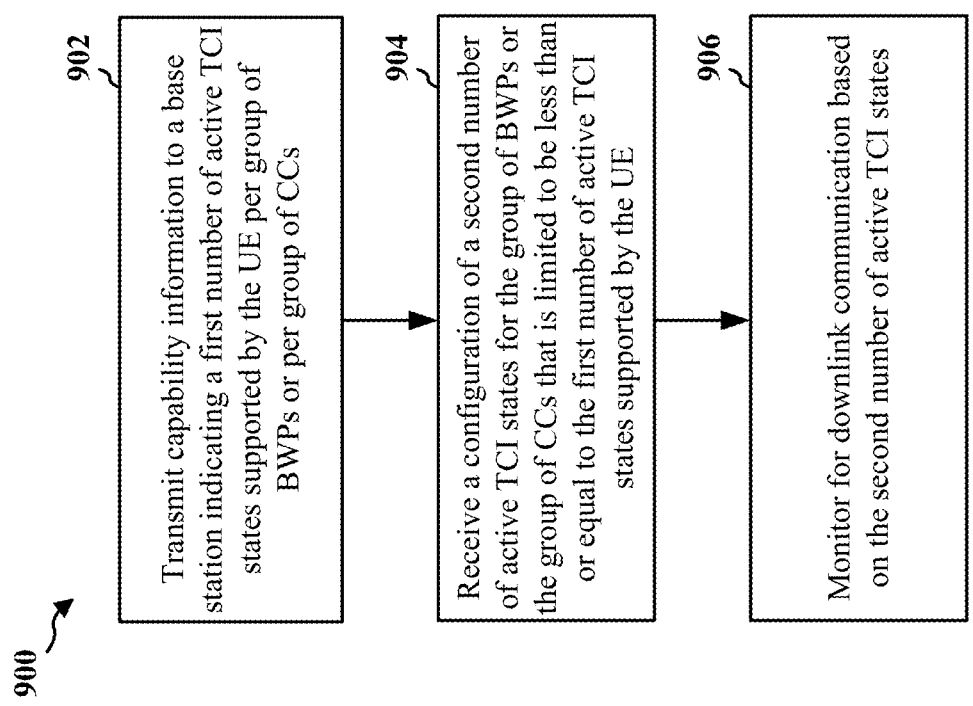
FIG. 9 is a flowchart illustrating a method of wireless communication that supports signaling of UE capability information about a number of active TCI states supported by a UE for a group of BWPs or a group of CC in accordance with some aspects of the present disclosure.

FIG. 9 is a flowchart 900 of a method of wireless communication. The method may be performed by a UE or a component of a UE (such as the UE 104, 350, 402; the apparatus 1102; the processing system 1214, which may include the memory 360 and which may be the entire UE 350 or a component of the UE 350, such as the TX processor 368, the RX processor 356, or the controller/processor 359).

At 902, the UE transmits capability information to a base station indicating a first number of active TCI states supported by the UE per group of BWPs or per group of CCs for use in receiving control information or data. The transmission of the capability information may be performed, for example, by the transmission component 1106 or the UE capability component 1108 of the apparatus 1102 in FIG. 11. The UE may further transmit an indication to the base station that indicates whether the group for which the first number of active TCI states is supported is the group of BWPs or the group of CCs. In some aspects, the capability information may indicate the first number of active TCI states supported by the UE for a frequency band. In some aspects, the capability information may indicate the first number of active TCI states supported by the UE for a cell group. The cell group may include a master cell group or a secondary cell group. For example, the UE may send UE capability information indicating a number of active TCI states that the UE supports for a master cell group. Alternatively or additionally, the UE may send UE capability information indicating a number of active TCI states that the UE supports for a secondary cell group.

At 904, the UE receives, from the base station, a configuration of a second number of active TCI states for the group of BWPs or the group of CCs that is limited to be less than or equal to the first number of active TCI states supported by the UE. The reception may be performed, for example, by the active TCI state component 1110 of the apparatus 1102 in FIG. 11. For example, the UE may receive an activation of TCI states for the group of BWPs or the group of CCs until the second number of active spatial relations equals the first number of spatial relations for the group of BWPs or the group of CCs.

At 906, the UE monitors for downlink communication based on the second number of active TCI states. The monitoring may be performed, for example, by the monitor component 1112 of the apparatus 1102 in FIG. 11.

Figure 10:
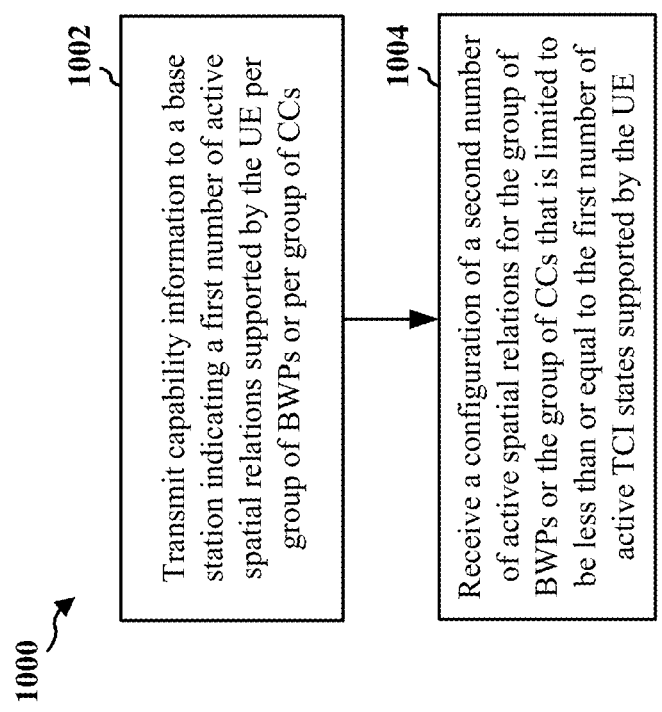
FIG. 10 is a flowchart illustrating a method of wireless communication that supports signaling of UE capability information about a number of active spatial relations supported by a UE for a group of BWPs or a group of CC in accordance with some aspects of the present disclosure.

FIG. 10 is a flowchart 1000 of a method of wireless communication. The method may be performed by a UE or a component of a UE (such as the UE 104, 350, 402; the apparatus 1102; the processing system 1214, which may include the memory 360 and which may be the entire UE 350 or a component of the UE 350, such as the TX processor 368, the RX processor 356, or the controller/processor 359).

At 1002, the UE transmits capability information to a base station indicating a first number of active spatial relations supported by the UE per group of BWPs or per group of CCs. The transmission of the capability information may be performed, for example, by the transmission component 1106 or the UE capability component 1108 of the apparatus 1102 in FIG. 11. The UE may further transmit an indication to the base station that indicates whether the group for which the first number of active spatial relations is supported is the group of BWPs or the group of CCs. In some aspects, the capability information may indicate the first number of active spatial relations supported by the UE for a frequency band. In some aspects, the capability information may indicate the first number of active spatial relations supported by the UE for a cell group. The cell group may include a master cell group or a secondary cell group. For example, the UE may send UE capability information indicating a number of active spatial relations that the UE supports for a master cell group. Alternatively or additionally, the UE may send UE capability information indicating a number of active spatial relations that the UE supports for a secondary cell group.

At 1004, the UE receives, from the base station, a configuration of a second number of active spatial relations for the group of BWPs or the group of CCs that is limited to be less than or equal to the first number of active spatial relations supported by the UE. The reception may be performed, for example, by the active spatial relations component 1114 of the apparatus 1102 in FIG. 11. For example, the UE may receive an activation of spatial relations for the group of BWPs or the group of CCs until the second number of active spatial relations equals the first number of spatial relations for the group of BWPs or the group of CCs.

Figure 11:
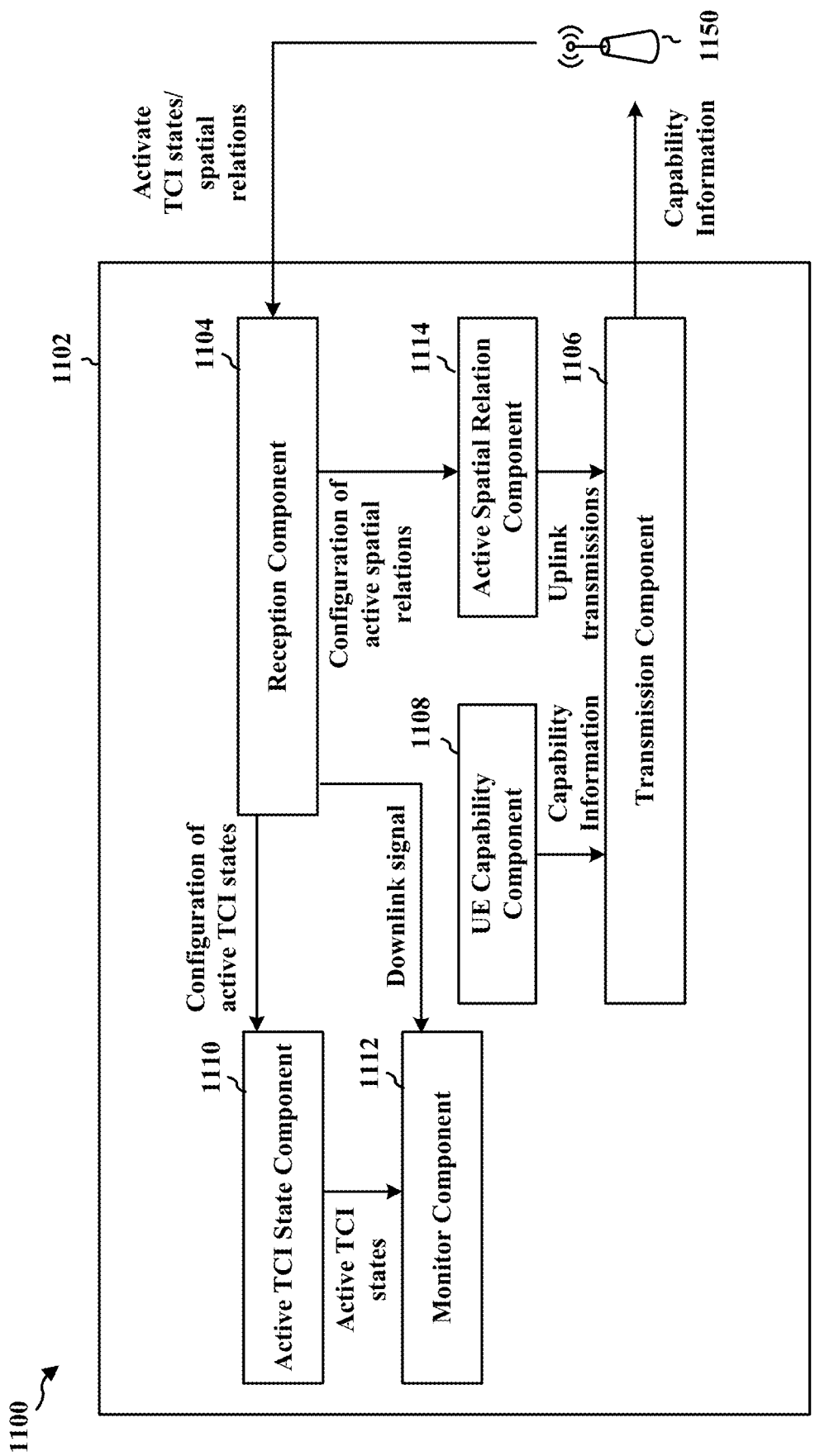
FIG. 11 is a conceptual data flow diagram illustrating the data flow between different components in an example apparatus in accordance with some aspects of the present disclosure.

FIG. 11 is a conceptual data flow diagram 1100 illustrating the data flow between different means/components in an example apparatus 1102. The apparatus may be a UE or a component of a UE. The apparatus 1102 includes a reception component 1104 that receives downlink communication from the base station 1150 and a transmission component 1106 that transmits uplink communication to the base station 1150. The apparatus may include a UE capability component 1108 configured to transmit capability information to a base station indicating a first number of active TCI states supported by the UE per group of BWPs or per group of CCs for use in receiving control information or data, such as described in connection with 902 in FIG. 9. The apparatus 1102 may include an active TCI state component 1110 configured to receive, from the base station, a configuration of a second number of active TCI states for the group of BWPs or the group of CCs that is limited to be less than or equal to the first number of active TCI states supported by the UE, such as described in connection with 904 in FIG. 9. The apparatus 1102 may include a monitor component 1112 configured to monitor for downlink communication based on the second number of active TCI states, such as described in connection with 906 in FIG. 9. The UE capability component 1108 may be further configured to transmit an indication that indicates whether the group for which the first number of active TCI states is supported is the group of BWPs or the group of CCs.

In some examples, the UE capability component 1108 may be configured to transmit capability information to a base station indicating a first number of active spatial relations supported by the UE per group of BWPs or per group of CCs, such as described in connection with 1002 in FIG. 10. The apparatus 1102 may include an active spatial relations component 1114 configured to receive, from the base station, a configuration of a second number of active spatial relations for the group of BWPs or the group of CCs that is limited to be less than or equal to the first number of active spatial relations supported by the UE, such as described in connection with 1004 in FIG. 10. The transmission component 1106 may be configured to transmit uplink communication based on the active spatial relations. The UE capability component 1108 may be further configured to transmit an indication that indicates whether the group for which the first number of active spatial relations is supported is the group of BWPs or the group of CCs.

The apparatus 1102 may include additional components that perform each of the blocks of the algorithm in the aforementioned flowcharts of FIGS. 9 and 10. As such, each block in the aforementioned flowcharts of FIGS. 9 and 10 may be performed by a component and the apparatus 1102 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
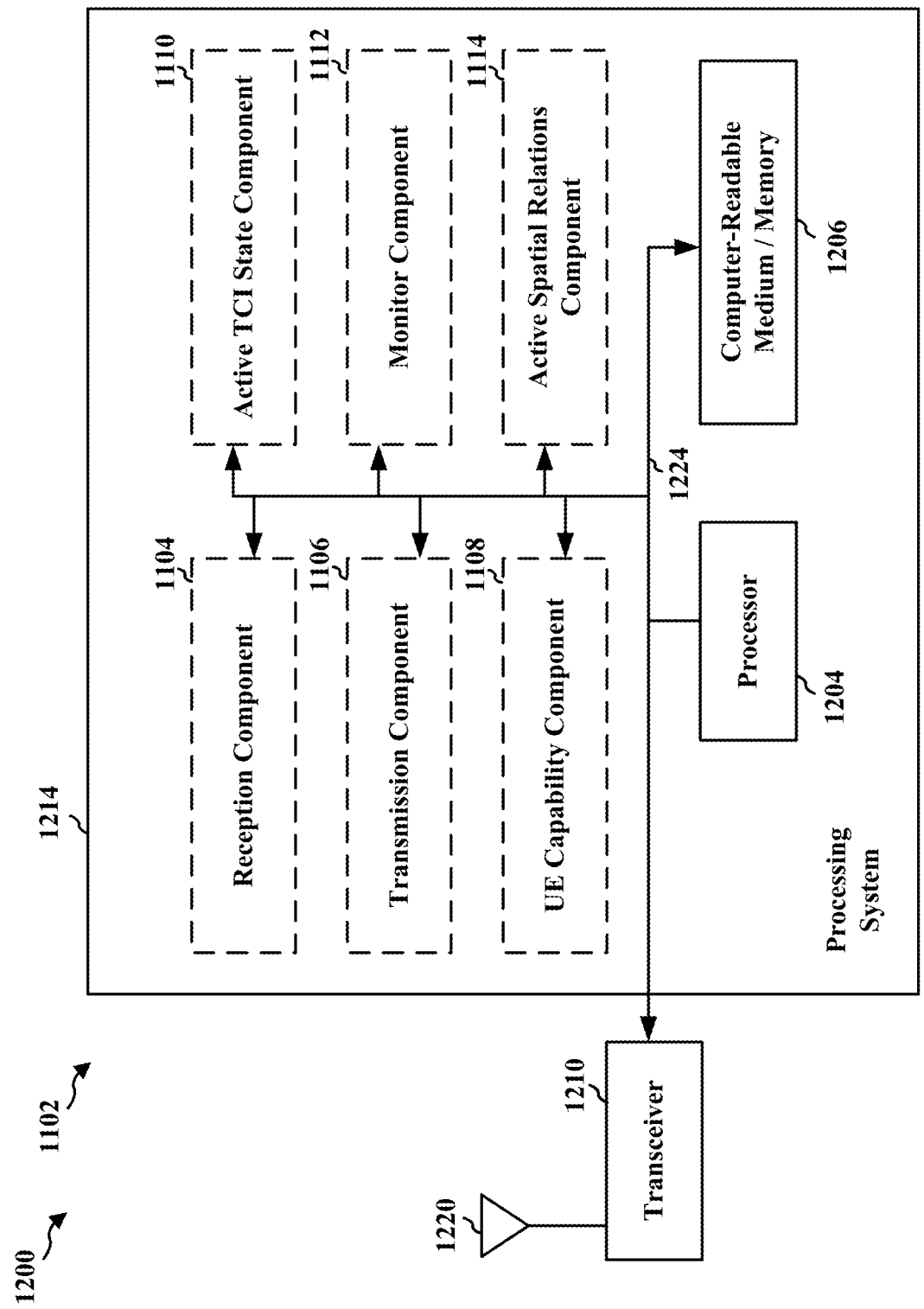
FIG. 12 is a diagram illustrating an example of a hardware implementation for an apparatus employing a processing system in accordance with some aspects of the present disclosure.

FIG. 12 is a diagram 1200 illustrating an example of a hardware implementation for an apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors or hardware components, represented by the processor 1204, the components 1104, 1106, 1108, 1110, 1112, 1114, and the computer-readable medium/memory 1206. The bus 1224 may also link various other circuits such as timing sources, peripherals, voltage regulators, and power management circuits.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described herein for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 or at least one of the TX processor 368, the RX processor 356, and the controller/processor 359. Alternatively, the processing system 1214 may be the entire UE (such as see 350 of FIG. 3).

In one configuration, the apparatus 1102 for wireless communication includes means for transmitting capability information to a base station indicating a first number of active TCI states supported by the UE per group of BWPs or per group of CCs for use in receiving control information or data. The apparatus 1102 may include means for receiving, from the base station, a configuration of a second number of active TCI states for the group of BWPs or the group of CCs that is limited to be less than or equal to the first number of active TCI states supported by the UE. The apparatus 1102 may include means for monitoring for downlink communication based on the second number of active TCI states. The apparatus 1102 may include means for transmitting an indication that indicates whether the group for which the first number of active TCI states is supported is the group of BWPs or the group of CCs. The apparatus 1102 may include means for transmitting capability information to a base station indicating a first number of active spatial relations supported by the UE per group of BWPs or per group of CCs. The apparatus 1102 may include means for receiving, from the base station, a configuration of a second number of active spatial relations for the group of BWPs or the group of CCs that is limited to be less than or equal to the first number of active spatial relations supported by the UE. The apparatus 1102 may include means for transmitting uplink communication based on the active spatial relations. The apparatus 1102 may include means for transmitting an indication that indicates whether the group for which the first number of active spatial relations is supported is the group of BWPs or the group of CCs. The aforementioned means may be one or more of the aforementioned components of the apparatus 1102 or the processing system 1214 of the apparatus 1102 configured to perform the functions recited by the aforementioned means. As described herein, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to those having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   transmitting, to a base station, capability information indicating a first number of active transmission configuration indication (TCI) states supported by the UE per group of bandwidth parts (BWPs) or per group of component carriers (CCs), wherein the first number of active TCI states do not exceed spatial resources allocated to the UE for the group of BWPs or the group of CCs;
   receiving, from the base station, a configuration of a second number of active TCI states for the group of BWPs or the group of CCs that is limited to be less than or equal to the first number of active TCI states based on the capability information; and
   monitoring for a downlink communication based on the second number of active TCI states.

2. The method of claim 1, wherein the capability information indicates the first number of active TCI states supported by the UE for a frequency band or a cell group.

3. The method of claim 2, wherein the cell group comprises a master cell group or a secondary cell group.

4. The method of claim 1, wherein:
   transmitting the capability information further comprises indicating whether the group for which the first number of active TCI states is supported is the group of BWPs or the group of CCs.

5. The method of claim 1, wherein each active TCI state supports receiving a physical downlink control channel (PDCCH) or a physical downlink shared channel (PDSCH).

6. A method of wireless communication at a user equipment (UE), comprising:
   transmitting, to a base station, capability information indicating a first number of active spatial relations supported by the UE per group of bandwidth parts (BWPs) or per group of component carriers (CCs), wherein the first number of active spatial relations do not exceed spatial resources allocated to the UE for the group of BWPs or the group of CCs;
   receiving, from the base station, a configuration of a second number of active spatial relations for the group of BWPs or the group of CCs that is limited to be less than or equal to the first number of active spatial relations supported by the UE based on the capability information; and
   monitoring for a downlink communication based on the second number of active spatial relations.

7. The method of claim 6, wherein the capability information indicates the first number of active spatial relations supported by the UE for a frequency band or a cell group.

8. The method of claim 7, wherein the cell group comprises a master cell group or a secondary cell group.

9. The method of claim 6, wherein:
   transmitting the capability information further comprises indicating whether the group for which the first number of active spatial relations is supported is the group of BWPs or the group of CCs.

10. An apparatus for wireless communication at a user equipment (UE), comprising:
    a memory; and
    at least one processor coupled to the memory and configured to:
       transmit, to a base station, capability information indicating a first number of active transmission configuration indication (TCI) states supported by the UE per group of bandwidth parts (BWPs) or per group of component carriers (CCs), wherein the first number of active TCI states do not exceed spatial resources allocated to the UE for the group of BWPs or the group of CCs;
       receive, from the base station, based on the transmitted capability information, a configuration of a second number of active TCI states for the group of BWPs or CCs that is limited to be less than or equal to the first number of active TCI states supported by the UE based on the capability information; and
       monitor for downlink communication based on the second number of active TCI states.

11. The apparatus of claim 10, wherein the capability information indicates the first number of active TCI states supported by the UE for a frequency band or a cell group.

12. The apparatus of claim 11, wherein the cell group comprises a master cell group.

13. The apparatus of claim 10, wherein the capability information further comprises an indication whether the group for which the first number of active TCI states is supported is the group of BWPs or the group of CCs.

14. The apparatus of claim 10, wherein each active TCI state supports receiving a physical downlink control channel (PDCCH) or a physical downlink shared channel (PDSCH).

15. An apparatus for wireless communication at a user equipment (UE), comprising:
 a memory; and
 at least one processor coupled to the memory and configured to:
  transmit, to a base station, capability information indicating a first number of active spatial relations supported by the UE per group of bandwidth parts (BWPs) or per group of component carriers (CCs), wherein the first number of active spatial relations do not exceed spatial resources allocated to the UE for the group of BWPs or the group of CCs; and
  receive, from the base station based on the capability information, a configuration of a second number of active spatial relations for the group of BWPs or the group of CCs that is limited to be less than or equal to the first number of active spatial relations supported by the UE.

16. The apparatus of claim 15, wherein the capability information indicates the first number of active spatial relations supported by the UE for a frequency band or a cell group.

17. The apparatus of claim 16, wherein the cell group comprises a master cell group or a secondary cell group.

18. The apparatus of claim 15, wherein capability information further comprises an indication whether the group for which the first number of active spatial relations is supported is the group of BWPs or the group of CCs.

* * * * *